May 18, 1965  A. BRUEDER  3,183,992
VARIABLE PRESSURE MEANS COOPERATING WITH THE
STEERING SHAFT OF VEHICLES
Filed Dec. 16, 1963  2 Sheets-Sheet 1
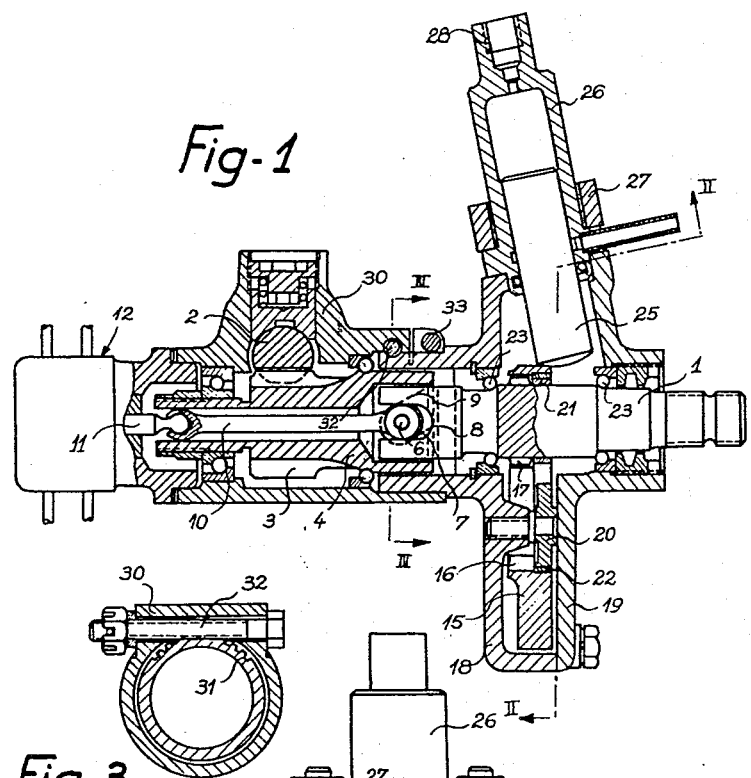
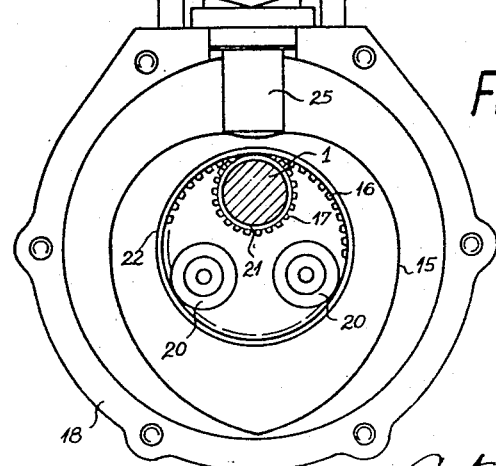

May 18, 1965  A. BRUEDER  3,183,992
VARIABLE PRESSURE MEANS COOPERATING WITH THE
STEERING SHAFT OF VEHICLES
Filed Dec. 16, 1963  2 Sheets-Sheet 2

Antoine Brueder,
Inventor

By Wenderoth, Lind and Ponack,
Attys.

United States Patent Office 3,183,992
Patented May 18, 1965

3,183,992
VARIABLE PRESSURE MEANS COOPERATING WITH THE STEERING SHAFT OF VEHICLES
Antoine Brueder, Paris, France, assignor to Societe Anonyme Andre Citroen, Paris, France, a corporation of France
Filed Dec. 16, 1963, Ser. No. 330,979
Claims priority, application France, Jan. 9, 1963, 920,854, Patent 82,895
7 Claims. (Cl. 180—79.2)

In a preceding patent application No. 152,192 filed on November 14, 1961, by the applicant, there is described notably an improvement in servo steering devices for automotive vehicles which consists in associating with the steering shaft or column controlling the servo-action device another device adapted to exert on said shaft a resistance proportional to the steering angle and preferably also to the speed of the vehicle, this device comprising, according to a preferred form of embodiment, a cam rotatably coupled with said steering shaft and engaged by a roller follower urged by a variable-pressure pneumatic or hydraulic device.

It is the chief object of the present invention to provide a specific form of embodiment of a device of this character which is remarkable notably by its constructional simplicity and compactness, and by its easy adjustment.

A typical embodiment of this servo steering device will be described hereinafter by way of example with reference to the attached drawing, in which:

FIGURE 1 illustrates diagrammatically in axial section a steering box associated with one part of the device of the present invention;

FIGURE 2 is a detail view taken along the line II—II of FIG. 1;

FIGURE 3 is a detail view taken along the line III—III of FIG. 1;

Figure 4:
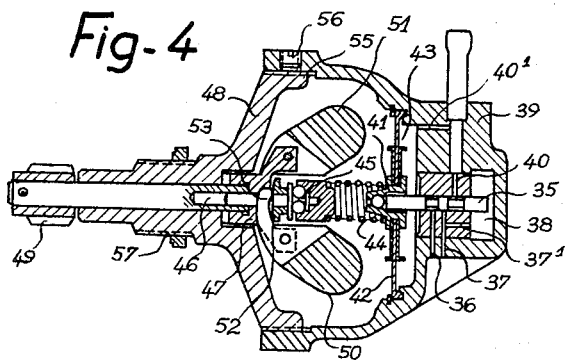
FIGURE 4 is an axial sectional view showing the governor incorporated in the device of this invention.

In the drawing, the reference numeral 1 designates a shaft of the steering control mechanism which is adapted to be turned or controlled by means of the steering wheel (not shown).

In this example the shaft 1 is adapted to operate a pinion-and-rack steering mechanism wherein the rack 2 is in constant meshing engagement with a pinion 3 formed on or carried by another shaft 4 coupled with the shaft 1 through a cross pin 6 carrying rollers 7 engaging guideways 8, 9 formed in said two shafts. These guideways extend obliquely with respect to each other whereby the rotation of shafts 1 and 4 is attended by a movement in one or the other direction of a rod 10 connected to the cross pin 6 to produce the positive displacement of a slide valve 11 of a pressure-fluid distributor 12 actuating in the known manner a pressure-fluid cylinder (not shown) having its movable member connected to the rack 2. Of course, the specific arrangements of the present invention which are described hereinafter are also applicable to any other servo steering system insofar as they concern primarily the means for exerting a controlled resistance to any steering or turning movement on the shaft 1 rotated by means of the steering wheel.

Mounted around the shaft 1 in the steering box 18 is a cam 15 formed with internal teeth 16 meshing with a pinion 17 solid with shaft 1. This cam 15 is rotatably centered in the case 18 provided with a cover 19 by means of a pair of rollers 20 carried by said box and also by means of a bushing or like ring 21 carried by the shaft 1, these three elements co-operating with an inner bushing or ring 22 fitted in the cam and adjacent to the teeth 16. The shaft 1 is also mounted in the case 18 and cover 19 by means of ball-bearings 23.

A push member 25 adapted to co-operate with the outer or operative contour of cam 15 is mounted in the case 18 and consists of a cylindrical piston slidably and rotatably fitted in a cylinder 26 secured on the case 18 by means of a suitable flange 27. The push member 25 is so arranged that its axis lies in a plane intersecting the imaginary axis of rotation of cam 15 and that in addition the surface of engagement of this push member with the cam is eccentered with respect to its axis so as to revolve about this axis during its operative engagement with said cam. Preferably, the push member 25 is also inclined in relation to the plane of said cam and has a rounded operative end in order properly to distribute the wear and facilitate the relative engagement of the co-operating or contact surfaces.

The cylinder 26 has an inlet port 28 adapted to be connected to a device delivering a fluid under a pressure variable under specific conditions to be set forth presently. The ratio of pinion 17 to the cam teeth 16 is such that the cam revolves through at the most a half-revolution when the steering wheel is moved from its straight-ahead driving position to any one of its fully steered positions.

As illustrated in FIG. 2 the cam 15 is so designed that for a given pressure produced in the cylinder 26 and exerted on the push member 25 the effort which the driver must exert on the steering wheel to turn same increases with the angle of steering of this wheel from its straight-ahead driving position. Thus, for example, this effort may increase gradually during one-third of the steering-wheel movement from its straight-ahead driving position, and subsequently remain constant until the fully-steered position is attained.

To permit the proper adjustment of push member 25 with respect to the dead centre position of cam 15 (as shown in FIG. 2) in the straight-ahead driving position of the steering wheel, the case 18 is adapted to be adjusted angularly in the fixed steering box 30; to this end, the case 18 is formed with a sector of peripheral teeth 31 engaged by a worm-like tangent screw 32 mounted in the case 18 and adapted to be locked in the desired adjustment position by means of a bolt 33.

Figure 5:
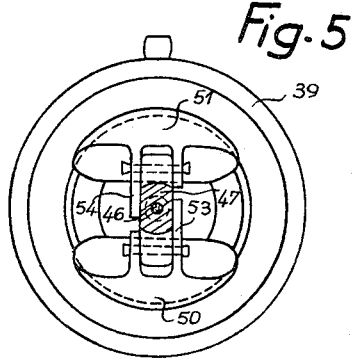
FIGURE 5 is a detail view taken transversely through the hub portion of the inertia weights of the governor.
Figure 6:
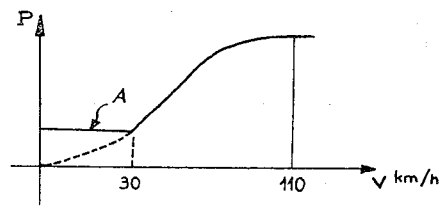
FIGURE 6 is a diagram plotting the value of the fluid pressure delivered by the governor of FIG. 4 as a function of the vehicle speed.

On the other hand, the pressure of the fluid delivered to the cylinder 26 is controlled by a governor illustrated in FIGS. 4 and 5 and adapted to deliver a fluid pressure proportional to the vehicle speed as shown in the diagram of FIG. 6 wherein the thick-line curve shows the fluid pressure P plotted in ordinates against the vehicle speed V in abscissa, the speed being given in kilometers per hour.

This governor comprises a fluid distributing device of known type comprising in turn a reservoir 35 having its ends responsive to the opposed actions of a force F produced by one portion of the governor as will be explained presently and of the delivered fluid pressure P, whereby the latter is constantly proportional to said force F. To this end, the distributor is connected to a source of fluid under pressure through a port 36 which the slide valve 35 may cause to communicate via the other port 37 with the cylinder 26, this port 37 comprising a branch passage 37¹ through which the pressure fluid delivered to cylinder 26 is also applied to a chamber 38 formed at the end of the slide valve in a portion 39 of the governor body. In addition the port 37 may also be connected through the slide valve 35 with an exhaust port 40. The slide valve 35 receives the aforesaid force F via a ball-type push member 41 mounted centrally of a flexible diaphragm 42 secured inside the portion 39 of the governor body in which it forms on the slide valve side a chamber 43 connected to the exhaust port 40 through a relatively narrow passage 40′ in order to damp out the slide valve control movements. On the opposite side of slide valve 35 the ball push member 41 is responsive to a coil compression spring 44 reacting against a ball thrust bearing 45 mounted on the end of a push member 46 constituting one element of a centrifugal device responsive to the speed of the vehicle. Said push member 46 is mounted centrally of a hub 47 carrying a plurality of inertia weights 50, 51; this hub 47 is mounted in turn for free rotation in one portion 48 of the governor body assembled with the aforesaid body portion 39. The shaft of the hub supporting the inertia weights is adapted to be driven for rotation from outside the governor body, for example from the speedometer drive or take-off of the vehicle, or from any other member rotatably connected to the wheels of the vehicle, through the medium of a pinion 49 connected to the shaft of the inertia-weight carrier hub 47. The inertia weights 50, 51 pivotally mounted on said hub are each provided with a single arm 53, 54 engaging a bearing socket 52 associated with the push member 46.

These arms 53, 54 extend on either side of the weight carrier hub 47 and co-operate with the bearing socket 52 at a point easily positioned on one diameter of said socket, this arrangement being particularly advantageous with respect to the sensitivity and regularity of operation of this centrifugal device.

The coil spring 44 of this governor is prestressed to a predetermined value whereby the governor produces a pressure threshold A (see FIG. 6) for the fluid delivered thereby to the cylinder 26 containing the push member 25 from zero speed to a certain speed (for example 30 km. p.h.) of the vehicle, whereby a certain return force is available in the steering shaft 1 when the vehicle is still or driven at low speeds as a function of the steering angle. The pressure exerted by the aforesaid spring 44 and therefore the value of this return effort are easily adjustable in this arrangement by simply screwing in or out at 55 the two sections 39 and 48 of the governor body, these sections being subsequently locked in the selected adjustment position by means of a set screw 56, the section 39 of the governor body comprising means such as 57 for mounting this body on the vehicle.

On the other hand, beyond the aforesaid pressure threshold A depending on the force and adjustment of spring 44, the pressure delivered to the cylinder 26 is responsive to the force produced by the rotation of the centrifugal inertia weights 50, 51, stress being laid herein upon the fact that these inertia weights are designed and mounted with a permissible or free angular movement such that the bearing socket 52 will move gradually, this displacement decreasing with higher vehicle speeds. Under these conditions the pressure increase caused by increasing vehicle speed can be reduced as shown in the diagram of FIG. 6, thereby desirably limiting the increase in the effort necessary for returning the steering wheel to its straight-ahead driving position. In this figure there is shown in dotted line the pressure that would be supplied by the inertia weights 50, 51 at low vehicle speeds if the spring 44 were not provided.

Of course, many modifications may be brought to the form of embodiment of the invention which is described hereinabove and illustrated in the accompanying drawing, without however departing from the spirit and scope of the invention as set forth in the appended claims.

I claim:
1. Servo steering of automotive vehicle, wherein the steering shaft controlling the servo-action device proper has associated therewith a device adapted to exert on said shaft a resistance to the steering movement, said last-named device comprising a cam rotatably connected to said shaft and co-operating with a push member responsive to a device delivering a fluid pressure varying at least as a function of the vehicle speed to create said resistance, and said cam is shaped to cause said resistance to vary with the steering angle characterized in that said cam is disposed around said steering shaft and formed with internal teeth in meshing engagement with a pinion connected to said shaft, said cam being centered on a member constituting the support of said push member.

2. Servo steering according to claim 1, characterized in that said push member constitutes a piston slidably mounted in a cylinder receiving the aforesaid fluid under pressure, said push member being disposed eccentrically in relation to its contact with said cam and extending somewhat obliquely to the plane of said cam.

3. Servo steering according to claim 1, characterized in that said supporting member on which said cam is centered consists of a case surrounding said steering shaft, said case being adjustable angularly in relation to the axis of said shaft.

4. Servo steering according to claim 3, characterized in that said case is adjustable by means of a mounting comprising peripheral teeth formed on one portion of said case, said teeth being engaged by a tangent adjustment screw.

5. Servo steering according to claim 1, characterized in that said variable fluid pressure device comprises a governor incorporating a fluid distributor of the type adapted to deliver a fluid pressure proportional to the force exerted on a distributor member in opposition to the delivered pressure, said force being exerted partly by a centrifugal inertia-weight assembly responsive to the vehicle speed, said centrifugal inertia-weight assembly acting upon said distributor member through the medium of a spring having a degree of prestress adjustable as a function of the desired steering resistance in the standstill condition of the vehicle.

6. Servo steering according to claim 5, characterized in that the prestress of said spring in said governor is adjustable by causing the relative displacement of two sections of the governor body which carry the one the inertia-weight carrier and the other said distributor member.

7. Servo steering according to claim 5, characterized in that in said governor body there is mounted a diaphragm responsive to the movement of said distributor member and bounding with said distributor member and said governor body a damping chamber comprising a narrow fluid passage leading to an external space.

References Cited by the Examiner

UNITED STATES PATENTS 2,862,722  12/58  Brueder _____ 280—94
3,009,524  11/61  Ostwald _____ 180—79.2

FOREIGN PATENTS 818,483  8/59  Great Britain.

A. HARRY LEVY, *Primary Examiner.*